(12) United States Patent
Bozek

(10) Patent No.: US 6,932,609 B1
(45) Date of Patent: Aug. 23, 2005

(54) BOOK CONFIGURATION AND METHODS FOR SAME USEABLE FOR TEACHING LITERACY

(75) Inventor: Michelle Bozek, 3732 Mentone Ave., Apartment 9, Los Angeles, CA (US) 90034

(73) Assignee: Michelle Bozek, Los Angeles, CA (US)

( * ) Notice: Subject to any disclaimer, the term of this patent is extended or adjusted under 35 U.S.C. 154(b) by 0 days.

(21) Appl. No.: 10/945,456

(22) Filed: Sep. 20, 2004

(51) Int. Cl.$^7$ ............................................... G09B 17/00
(52) U.S. Cl. ...................................................... 434/178
(58) Field of Search ................................ 434/156, 157, 434/178; 283/46; 281/33, 38, 51, 107

(56) References Cited

U.S. PATENT DOCUMENTS

| | | | | |
|---|---|---|---|---|
| 1,353,371 A | * | 9/1920 | Winslow | 283/63.1 |
| 4,819,963 A | * | 4/1989 | Wolski | 281/15.1 |
| 5,653,470 A | * | 8/1997 | Bennett | 281/15.1 |
| 5,788,503 A | * | 8/1998 | Shapiro et al. | 434/172 |
| 5,921,579 A | * | 7/1999 | Sadler | 281/33 |
| 5,957,693 A | * | 9/1999 | Panec | 434/178 |
| 6,101,367 A | * | 8/2000 | Luciano | 434/308 |
| 6,364,360 B1 | * | 4/2002 | Kaufman | 281/15.1 |
| 6,683,611 B1 | * | 1/2004 | Cleveland | 345/471 |
| 6,712,396 B2 | * | 3/2004 | Derraugh | 281/38 |

FOREIGN PATENT DOCUMENTS

GB      2 237 203 A      1/1999

* cited by examiner

Primary Examiner—Kurt Fernstrom
(74) Attorney, Agent, or Firm—Knobbe, Martens, Olson & Bear LLP

(57) ABSTRACT

A book for teaching literacy skills comprises a plurality of pages supported by a binding. Content, including illustrations and text, printed on a first selected page of the book is substantially the same as content printed on a second selected page of the book. When the book is opened, a first person sitting on a first side of the book can simultaneously view the content with a second person sitting on a second side of the book. The second side of the book is opposite the first side of the book.

24 Claims, 3 Drawing Sheets

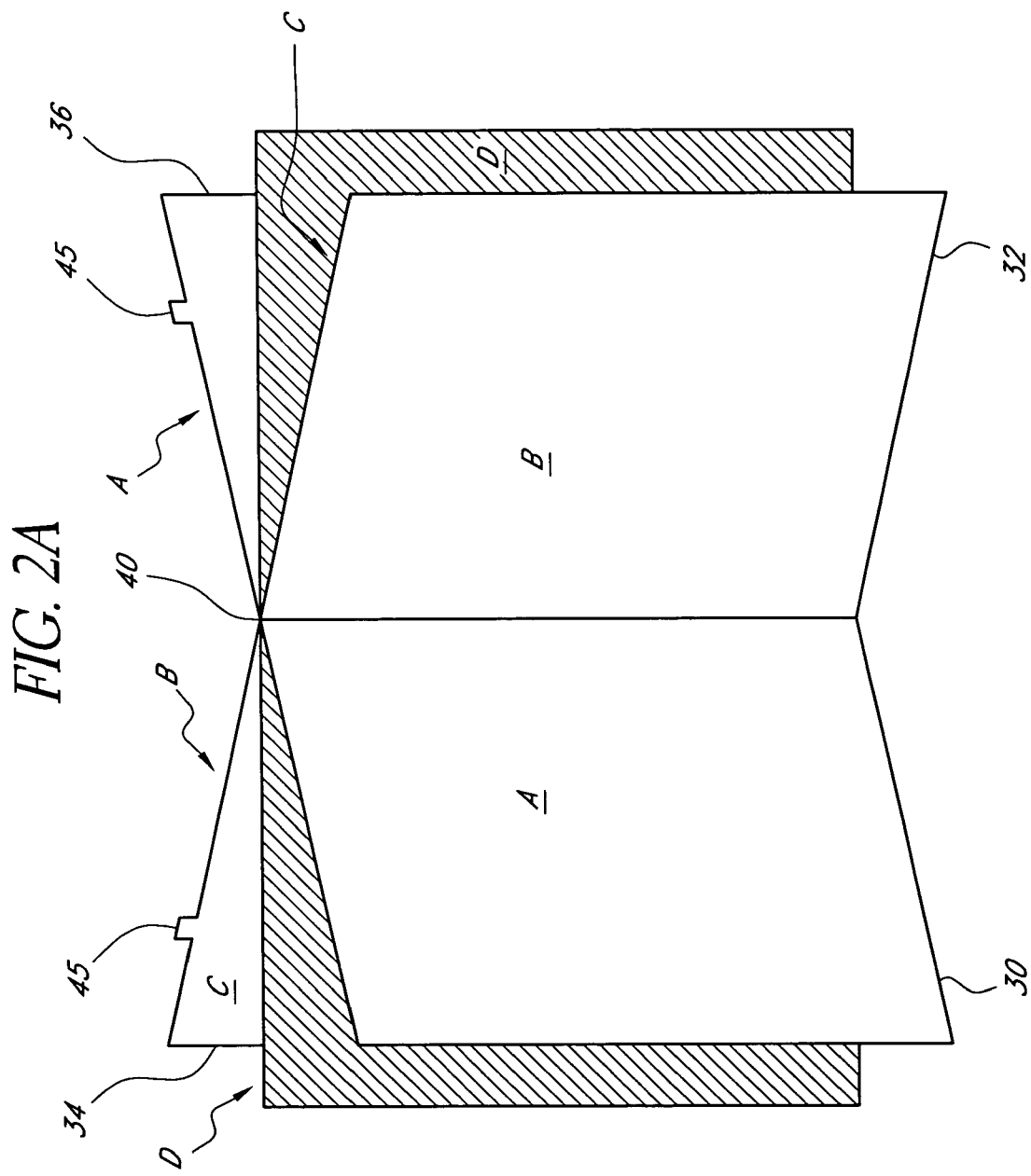

BOOK CONFIGURATION AND METHODS FOR SAME USEABLE FOR TEACHING LITERACY

FIELD OF THE INVENTION

This invention relates generally to books, and relates more specifically to a book with content that is simultaneously viewable from two opposing positions.

BACKGROUND OF THE INVENTION

Children who learn to read at an early age have greatly expanded opportunities for future growth and development. Therefore, significant resources have been devoted to learning more about effective ways to teach children to read. Generally, the earlier in life that literacy development begins for a child, the more effective the educational process will be. One important way to help children develop their literacy skills is to participate in reading and storytelling activities. Such activities not only help a child grow intellectually, but they also provide the child with social and emotional development opportunities as well. It is generally acknowledged that children should be actively involved in handling books and interacting with family members and teachers during reading activities. Indeed, the benefits to be gained from reading and storytelling activities are so widely recognized that many pediatricians prescribe reading to children along with regular check-ups and vaccinations.

When a child participates in reading and storytelling activities, a wide variety of factors contribute to the development of the child's literacy skills. For example, bright and colorful illustrations can captivate even young infants whose eyes are only beginning to focus. As children begin to develop hand-eye coordination, "point-and-say" books provide an important avenue for developing basic motor skills and for learning basic linguistic sounds. By watching someone read a familiar book, children can begin to match print to sound, and can begin to develop their memory skills as well. Remarkably, these and other benefits can be gained by simply sitting with a child and reading a book.

SUMMARY OF THE INVENTION

As alluded to above, one of the most important developmental aspects of storytelling with young children is the ability of the child to simultaneously look at the same page that the reader is reading. While conventional books can sometimes provide simultaneous viewing in a one-on-one reading situation, such as when a child sits side-by-side of the reader, allowing a large group of children to simultaneously view the book being read presents a more formidable challenge. This challenge is particularly pronounced in a classroom setting, where a teacher may read a single book to a large group of children, such as a class of 10 or 20 children. To address this challenge, an improved dual-sided book has been developed that allows both a reader and an audience facing the reader to simultaneously read the book, including, for example, both text, pictures and/or illustrations.

According to one aspect of the present invention, a book for teaching literacy skills comprises a plurality of pages supported by a binding. Content, including illustrations and text, printed on a first selected page of the book is substantially the same as content printed on a second selected page of the book. When the book is opened, a first person sitting on a first side of the book can simultaneously view the content with a second person sitting on a second side of the book. The second side of the book is opposite the first side of the book.

According to another embodiment of the present invention, a book for teaching literacy comprises a binding. The book further comprises a first group of sheets supported by the binding and having a first content. The book further comprises a second group of sheets supported by the binding and having a second content. The second content is substantially similar to the first content. The first and second groups of sheets are configured such that the first content and the second content are simultaneously viewable from opposite sides of the book.

According to another embodiment of the present invention, a method of manufacturing a book comprises providing a first content on a first group of sheets. The method further comprises providing a second content on a second group of sheets. The second content is substantially similar to the first content. The method further comprises securing the first and second groups of sheets to a binding such that the first and second content are simultaneously viewable from opposite sides of the book.

According to another embodiment of the present invention, a book comprises an elongate binding supporting a plurality of sheets. The sheets are rotatable around the binding. The plurality of sheets comprises a first group of pages having a first content and a second group of pages having a second content substantially the same as the first content. A selected sheet includes a portion of the first content on a first page, and a portion of the second content on a second page opposite the first page. A first and second person facing each other, with the book positioned between them, can simultaneously view portions of the first and second content which are substantially the same.

According to another embodiment of the present invention, a method of teaching literacy comprises providing a dual-sided book. The dual-sided book comprises a plurality of sheets secured to and rotatable around a binding. The method further comprises reading, by an instructor, first content on a first portion of a first sheet facing the instructor while substantially the same content is displayed on a portion of a second sheet facing a student. The method further comprises rotating the first sheet around the binding, such that second content on a portion of a third sheet facing the instructor is simultaneously displayed on a second portion of the first sheet facing the student.

BRIEF DESCRIPTION OF THE DRAWINGS

Exemplary embodiments of the dual-sided book are illustrated in the accompanying drawings, which are for illustrative purposes only. The drawings comprise the following figures, in which like numerals indicate like parts.

FIG. 2A is a perspective view of an exemplary dual-sided book having binding wherein the pages are configured to rotate approximately 180° with respect to the binding.

DETAILED DESCRIPTION OF PREFERRED EMBODIMENTS

As described above, a dual-sided book has been developed that allows both a reader and an audience facing the reader to simultaneously read the book. Various exemplary embodiments of such a dual-sided book are described below. However, these descriptions are illustrative only, and are not intended to limit the scope of the present invention, which is defined only by the claims.

Figure 1B:
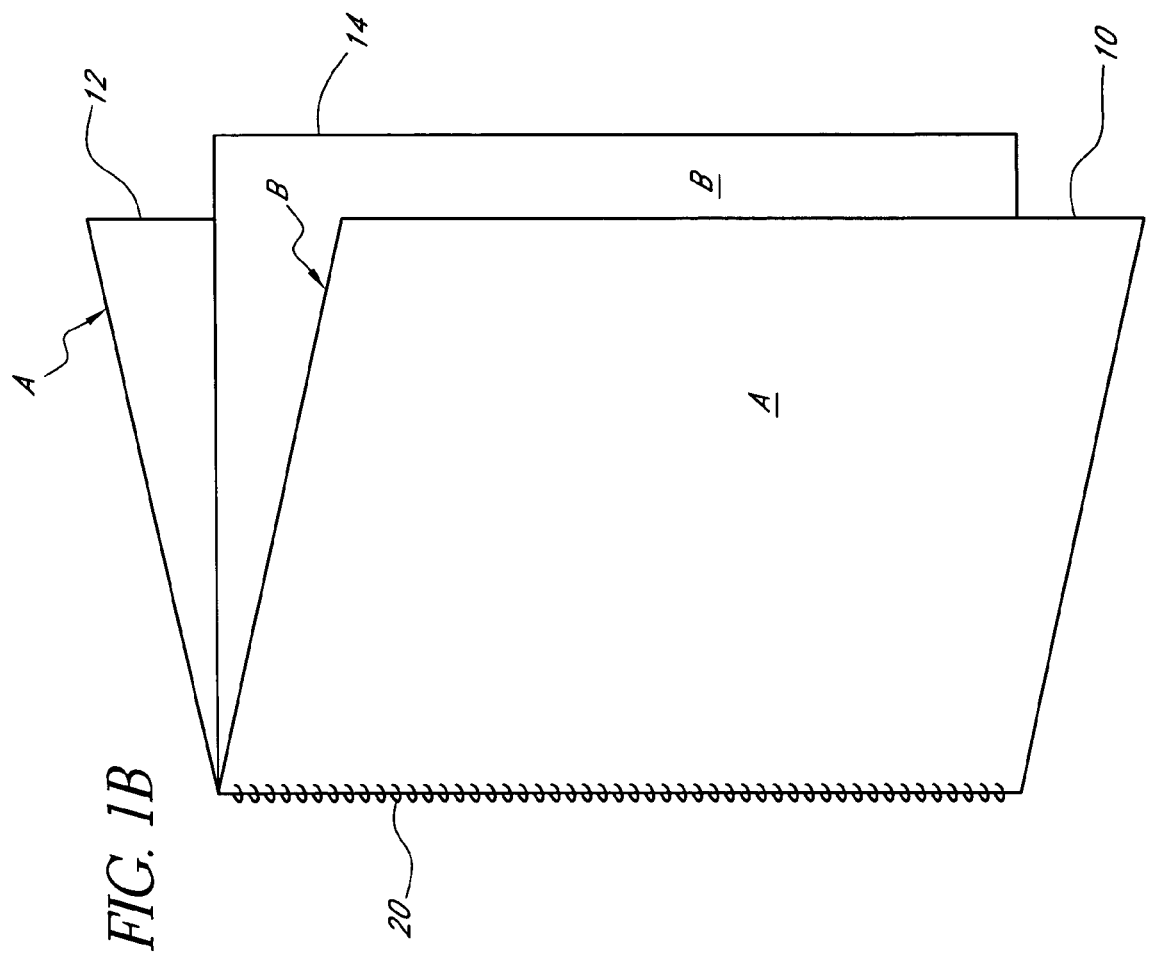
FIG. 1B is a perspective view of the dual-sided book of FIG. 1A.
Figure 1A:
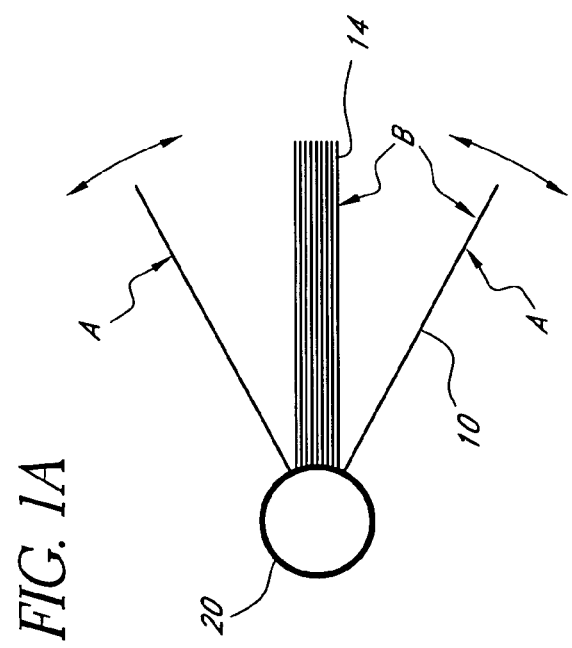
FIG. 1A is a top-down view of an exemplary dual-sided book having binding wherein the pages are configured to rotate approximately 360° with respect to the binding.

One exemplary embodiment of a dual-sided book is illustrated in FIGS. 1A and 1B. The term "book", as used herein, includes magazines, newspapers, and other reading materials. As illustrated, a plurality of sheets 10, 12, 14 are rotatably secured to a binding 20. An individual sheet includes two opposing pages, thereby allowing different content to be printed on both pages of the sheet. For example, as illustrated in FIGS. 1A and 1B, sheet 10 has content A printed on a first page, and content B printed on the second, opposing page. The content can include text, illustrations, and/or other printed matter.

Still referring to the exemplary embodiment illustrated in FIGS. 1A and 1B, the content of the sheets is configured such that persons located on opposite sides of the book see substantially the same content, with optionally substantially the same appearance, as each other as the sheets are turned. For example, content A is printed on both sheet 10 and sheet 12, thereby allowing persons positioned on opposite sides of the book to simultaneously view content A. By way of further example, if content A includes both text and illustrations, the placement of the text relative to the illustrations is optionally the same on both sheet 10 and sheet 12. When sheet 10 is rotated around the binding, content B, which is printed on both sheet 14 and sheet 10, will then be simultaneously visible to persons located on opposite sides of the book. By repeating this pattern, selected content can continue to be simultaneously visible to persons positioned on opposite sides of the book as the sheets are turned.

As described herein, this configuration advantageously allows a teacher to read a book to one or more children who are facing the teacher, while allowing the one or more children to simultaneously view the content that the teacher is reading. While particularly useful in the context of teaching literacy, this configuration can also be used in other applications where it is sought to allow people facing each other to simultaneously view content being presented in a book.

In an exemplary embodiment, the sheets 10, 12, 14 comprise paper sheets, although in other embodiments other materials can be used for the sheets, such as cloth, cardboard, plastic or other appropriate materials. The content printed on the pages of the sheets optionally includes a wide variety of printed matter, such as text, illustrations, or a combination of both. In one embodiment, the content includes fold-out figures and/or fold-out pages, which are especially popular in the field of children's books. In another embodiment, the content includes "scratch-and-sniff" areas, thereby allowing young readers to interact with the content. In yet another embodiment, a first content on a first page facing a first reader is in a first font size, while a second content on a second page facing a second reader opposing the first reader is in a second font size.

In modified embodiments, the content includes text in multiple languages. For example, in one modified embodiment, the content on a selected page includes interlined text in two different languages. In another embodiment, a first content on a first page facing a first reader is in a first language, while a second content on a second page facing a second reader opposing the first reader is in a second language, wherein the second content is a translation of the first content. This configuration advantageously can be used to teach a foreign language to people of all ages.

In the exemplary embodiment illustrated in FIGS. 1A and 1B, the binding 20 comprises spiral binding, thereby allowing the sheets 10, 12, 14 to rotate substantially around the entire binding. In other embodiments, other types of binding can be used, such as, but not limited to, stapled binding, glued binding, ring binding, coil binding, wire binding, thermal binding, stitched binding, perfect binding, lay-flat binding, and paperback binding. In still other embodiments, the binding can be selected to allow sheets to be added to or removed from the book, such as by using openable metal or plastic rings inserted through holes in a book page.

The exemplary dual-sided book illustrated in FIGS. 1A and 1B optionally includes one or more cover sheets. In such embodiments, the cover sheets comprise a more rugged material than the other sheets, such as pressed paperboard, thereby lending the book greater durability. As with the other sheets described herein, the cover sheets can be configured to include printed matter that is simultaneously viewable from opposite sides of the book.

Figure 2B:
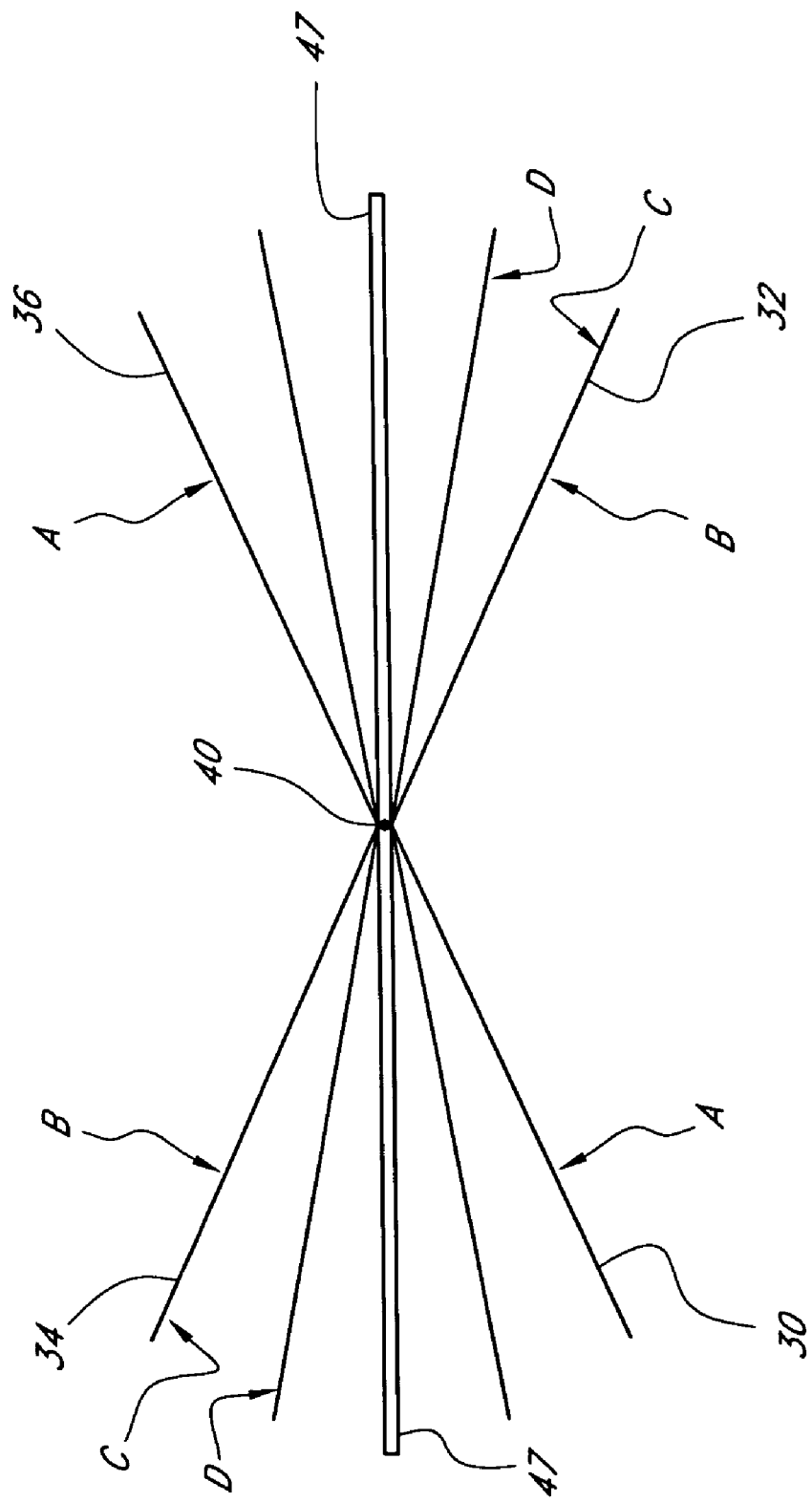
FIG. 2B is a top-down view of the dual-sided book of FIG. 2A.

Another exemplary embodiment of a dual-sided book is illustrated in FIGS. 2A and 2B. As illustrated, a plurality of sheets 30, 32, 34, 36 are rotatably secured to a binding 40. An individual sheet includes two opposing pages, thereby allowing different content to be printed on both sides of the sheet. For example, as illustrated in FIGS. 2A and 2B, sheet 32 has content B printed on a first page, and content C printed on the second, opposing page. The content can include text, illustrations, and/or other printed matter.

Still referring to the exemplary embodiment illustrated in FIGS. 2A and 2B, the content of the sheets is configured such that persons located on opposite sides of the book see substantially the same content as the sheets are turned. For example, content A/B is printed on sheets 30/32 as well as on sheets 36/34, thereby allowing persons positioned on opposite sides of the book to simultaneously view content A/B.

In using the book, after content A/B has been viewed and the readers are ready to move to the subsequent content C/D, sheets 32 and 34 are turned. This allows content C/D to be simultaneously viewable to persons located on opposite sides of the book. By repeating this pattern, content can continue to be simultaneously visible to persons on opposite sides of the book as the sheets are turned. In such embodiments, when the individual sheets are turned, they are rotated approximately 180° with respect to the binding.

Similar to the other embodiments described herein, this configuration advantageously allows a teacher or other reader to read a book to one or more children who are facing the teacher, while allowing the one or more children to simultaneously view the content that the teacher is reading. This configuration also advantageously allows both the children and the teacher viewing the book to view two pages simultaneously.

In a modified embodiment, one or more sheets optionally include a tab 45, as illustrated in FIG. 2A. The tab 45 optionally includes page number information. This configuration advantageously allows a person on one side of the book to easily see which pages are facing the opposite reader without flipping the book around. The tabs 45 can optionally be included in the embodiments illustrated in FIGS. 1A and 1B.

As described herein, in an exemplary embodiment the sheets comprise paper sheets, although in other embodiments other materials can be used for the sheets, such as cloth, cardboard, plastic, and other appropriate materials. The content printed on the pages of the sheets optionally includes a wide variety of printed matter, such as text, illustrations, or a combination of both. In one embodiment, the content includes fold-out figures and/or fold-out pages. In another embodiment, the content includes "scratch-and-sniff" areas. In still other embodiments, the content includes text printed in more than one language.

In the exemplary embodiment illustrated in FIGS. 2A and 2B, the binding 40 comprises spiral binding, thereby allowing the sheets 30, 32, 34, 36 to lay substantially flat with respect to the persons viewing the book. However, in other embodiments, other types of binding can be used, including, but not limited to, stapled; binding, glued binding, ring binding, coil binding, wire binding, thermal binding, stitched binding, perfect binding, lay-flat binding, and paperback binding. In still other embodiments, the binding can be selected to allow sheets to be added to or removed from the book.

The exemplary dual-sided book illustrated in FIGS. 2A and 2B optionally includes one or more cover sheets. For example, in FIG. 2B, cover sheets 47 separate the sheets 30, 32 configured to be viewed by the first readers from the sheets 34, 36 configured to be read by the second reader. In a modified embodiment, additional sets of cover sheets are included, such that a set of cover sheets also face the first and second readers. As described herein, the cover sheets optionally comprise a more rugged material than the other sheets, such as pressed paperboard, thereby lending the book greater durability. As with the other sheets described herein, the cover sheets can be configured to include printed matter that is simultaneously viewable from opposite sides of the book.

SCOPE OF THE INVENTION

While the foregoing detailed description discloses several embodiments of the present invention, it should be understood that this disclosure is illustrative only and is not limiting of the present invention. Furthermore, while the various embodiments disclosed herein are described in terms of reading to children, these embodiments are equally applicable to other applications wherein information in a book is to be shared with a larger audience. It should be appreciated that the specific configurations and operations disclosed can differ from those described above, and that the methods described herein can be used in contexts other than literacy education, such as in math textbooks, geography textbooks, and language textbooks.

I claim:

1. A book for teaching literacy comprising:
a binding;
a first group of sheets supported by the binding and having a first content distributed over the first group of sheets; and
a second group of sheets supported by the binding and having a second content distributed over the second group of sheets, wherein the second content is substantially similar to the first content;
wherein the first and second group of sheets are configured such that a first group page having a first subset of the first content printed thereon is simultaneously viewable as a second group page having a second subset of the second content printed thereon, wherein the first subset content is substantially the same as the second subset content, wherein the first group page and the second group page are positionable on opposite sides of the book.

2. The book of claim 1, wherein the first content includes text and illustrations.

3. The book of claim 1, wherein the first content includes language written in a first language and the second content includes language written in a second language.

4. The book of claim 1, wherein the first content includes text in a first language and a translation of the text into a second language.

5. The book of claim 1, wherein the binding is a spiral binding.

6. The book of claim 1, further comprising;
a first book cover associated with the first group of sheets; and
a second book cover associated with the second group of sheets.

7. The book of claim 1, wherein the first and second group of sheets comprise paper sheets.

8. The book of claim 1, wherein the first and second group of sheets comprise cloth sheets.

9. A method of manufacturing a book, the method comprising:
providing a first content on a first group of sheets;
providing a second content on a second group of sheets, wherein the second content is substantially similar to the first content; and
securing the first and second groups of sheets to a binding such that the first and second content are simultaneously viewable from opposite sides of the book.

10. The method of claim 9, wherein the first content is printed in a first language, and the second content is printed in a second language.

11. The method of claim 9, comprising;
securing a first cover around the first group of sheets; and
securing a second cover around the second group of sheets.

12. The method of claim 9, further comprising securing a first cover around the first and second groups of sheets.

13. The method of claim 9, wherein the binding is a spiral binding.

14. The method of claim 9, wherein the binding comprises glue deployed to secure a plurality of sheets together.

15. A book comprising an elongate binding supporting a plurality of sheets, such that the sheets are rotatable around the binding, wherein:
the plurality of sheets comprises a first group of pages having a first content and a second group of pages having a second content substantially the same as the first content, wherein
a selected sheet includes a portion of the first content on a first page, and a portion of the second content on a second page opposite the first page, and wherein when a first and second person are positioned facing each other, with the book positioned between them, the first and second persons can simultaneously view portions of the first and second content which are substantially the same.

16. The book of claim 15, wherein the binding is a spiral binding.

17. The book of claim 15, wherein the binding is a ring binding.

18. The book of claim 15, wherein the binding is configured to allow individual pages to be added to or removed from the binding.

19. The book of claim 15, wherein at least one of the pages in the first group of pages includes a raised tab having page number information printed thereon.

20. An apparatus comprising:
- a binding;
- a first group of sheets supported by the binding and having a first content;
- a second group of sheets supported by the binding and having a second content substantially the same as the first content, wherein the first and second groups of sheets are simultaneously viewable from opposite sides of the book; and
- a raised tab included on a selected sheet in the second group of sheets, the raised tab having page number information printed thereon, wherein the page number information is viewable by a person viewing the first group of sheets.

21. The apparatus of claim 20, wherein the first and second groups of sheets comprises cloth sheets.

22. The apparatus of claim 20, wherein the first and second content includes text and illustrations.

23. The apparatus of claim 20, further comprising:
- a first book cover associated with the first group of sheets; and
- a second book cover associated with the second group of sheets.

24. The apparatus of claim 20, wherein the binding comprises glue deployed to secure a plurality of sheets together.

* * * * *